United States Patent
Chalfin

(10) Patent No.: US 11,692,636 B2
(45) Date of Patent: Jul. 4, 2023

(54) HYDROSTATICALLY ADJUSTABLE VALVE AND ASSOCIATED SYSTEM

(71) Applicant: Flow Dynamics, LLC, Encinitas, CA (US)

(72) Inventor: Jeffrey Alan Chalfin, Carlsbad, CA (US)

(73) Assignee: FLOW DYNAMICS, LLC, Encinitas, CA (US)

( * ) Notice: Subject to any disclaimer, the term of this patent is extended or adjusted under 35 U.S.C. 154(b) by 164 days.

(21) Appl. No.: 16/953,998

(22) Filed: Nov. 20, 2020

(65) Prior Publication Data

US 2021/0095773 A1    Apr. 1, 2021

Related U.S. Application Data

(63) Continuation-in-part of application No. 15/973,855, filed on May 8, 2018, now Pat. No. 11,016,512, which is a continuation-in-part of application No. 15/496,212, filed on Apr. 25, 2017, now Pat. No. 10,544,569.

(51) Int. Cl.
| | |
|---|---|
| *F16K 17/06* | (2006.01) |
| *E03B 11/08* | (2006.01) |
| *F15D 1/06* | (2006.01) |

(52) U.S. Cl.
CPC ............ *F16K 17/065* (2013.01); *E03B 11/08* (2013.01); *F15D 1/06* (2013.01)

(58) Field of Classification Search
CPC ....... F16K 17/06; F16K 17/065; F16K 17/168
USPC .......................... 137/524, 530, 540, 542, 543
See application file for complete search history.

(56) References Cited

U.S. PATENT DOCUMENTS

| | | | |
|---|---|---|---|
| 678,565 | A | 7/1901 | Herbst |
| 967,514 | A | 8/1910 | Groh |
| 1,785,271 | A | 12/1930 | Lemex |
| 2,301,276 | A | 11/1942 | Gussick |
| 2,594,641 | A | 4/1952 | Griffith et al. |
| 2,870,784 | A | 1/1959 | Walter |
| 3,255,774 | A | 6/1966 | Gallagher et al. |
| 3,405,927 | A | 10/1968 | Josef et al. |
| 3,422,840 | A | 1/1969 | Bryant et al. |
| 3,434,495 | A | 3/1969 | Scaramucci |

(Continued)

OTHER PUBLICATIONS

Original and Translation of DE 3508685 A1; Klein Wolfgang; Tocha Klaus; Sep. 18, 1986.*

*Primary Examiner* — Paul J Gray
(74) *Attorney, Agent, or Firm* — GrayRobinson, P.A.; Michael J. Colitz, III

(57) ABSTRACT

The present disclosure relates to a hydrostatically adjustable flow control valve. In one embodiment, the valve includes a fixed sleeve that slidably receives a spool. A spring biases the spool relative to the fixed sleeve. A primary orifice is used to deliver fluid to the interior area of the fixed sleeve and spool. A control device is used to selectively vary the rate at which fluid drains from the interior area. Draining the fluid results in the spool being received within the interior of the fixed sleeve. The movement of the spool opens flow ports within the sleeve. This, in turn, allows fluid to exit the valve. Conversely, the control device can be set to prevent fluid drainage. This results in the spool extending from interior of the fixed sleeve, the closure of the flow ports, and the sealing of the valve.

5 Claims, 4 Drawing Sheets

(56) References Cited

U.S. PATENT DOCUMENTS

| | | | |
|---|---|---|---|
| 3,747,629 | A | 7/1973 | Bauman |
| 3,938,542 | A | 2/1976 | Bolha |
| 4,450,861 | A * | 5/1984 | Bouteille .............. F15B 11/064 |
| | | | 137/553 |
| 4,466,461 | A | 8/1984 | Weiss |
| 4,535,808 | A | 8/1985 | Johanson et al. |
| 4,757,974 | A | 7/1988 | Ward et al. |
| 5,349,984 | A | 9/1994 | Weinheimer et al. |
| 5,379,835 | A | 1/1995 | Streich |
| 6,866,062 | B2 | 3/2005 | Lammers |
| 8,707,981 | B2 | 4/2014 | Edgeworth |
| 8,944,098 | B1 | 2/2015 | Bocos et al. |
| 9,404,244 | B1 | 8/2016 | Gass et al. |
| 2004/0045607 | A1 | 3/2004 | Lammers |
| 2004/0079418 | A1 | 4/2004 | Weis et al. |
| 2007/0039652 | A1 | 2/2007 | Staggs |
| 2007/0044848 | A1 | 3/2007 | Norman |
| 2009/0007973 | A1 | 1/2009 | Benvenuto |
| 2009/0289207 | A1 | 11/2009 | Barreda et al. |
| 2012/0118406 | A1 | 5/2012 | Edgeworth |
| 2013/0261813 | A1 * | 10/2013 | Ibsen ...................... F16K 3/246 |
| | | | 700/282 |
| 2014/0182717 | A1 | 7/2014 | Edgeworth |
| 2015/0034179 | A1 * | 2/2015 | Loga ....................... F16K 3/246 |
| | | | 137/535 |

\* cited by examiner

HYDROSTATICALLY ADJUSTABLE VALVE AND ASSOCIATED SYSTEM

CROSS REFERENCE TO RELATED APPLICATIONS

This application is a continuation-in-part of, and claims priority to, co-pending application Ser. No. 15/973,855 filed May 8, 2018, and entitled "Externally Adjustable Flow Management Valve Assembly and System," which itself is a continuation-in-part of, and claims priority to application Ser. No. 15/496,212 filed on Apr. 25, 2017 and entitled "Externally Adjustable Flow Management Valve Assembly and System," now U.S. Pat. No. 10,544,569 issued Jan. 28, 2020, the contents of which are incorporated herein for all purposes.

TECHNICAL FIELD

This disclosure relates to a valve. More particularly, the present disclosure relates to a hydrostatically adjustable valve that can be used to regulate the flow of a fluid. The disclosure further relates to a system incorporating such a valve.

BACKGROUND OF THE INVENTION

Flow regulating valves are known in the art and have varied uses. Flow regulating vales, for example, can be used to drive out entrained air and increase fluid densities. U.S. Pat. App. 2009/0289207 to Barreda discloses a flow regulating valve that is disposed within a water supply line. The valve is structured to reduce or significantly eliminate entrained air present within the water. By driving out air, the density of the water is increased. The valve body of Barreda includes a sealing structure that is biased under a predetermined force into sealing relation with an inlet. The predetermined force is sufficient to prevent displacement of the sealing structure out of the sealing relation with the inlet, but insufficient to prevent displacement of the sealing structure when force from a normal water flow is exerted thereon. As a result, any air flow within the water supply line will be compressed or otherwise disbursed. This increases the efficiency of associated water meters and reduces the charges to a metered facility.

Although the device of Barreda is sufficient to achieve its stated objective, it is lacking in many respects. The valve assembly of Barreda is needlessly complex with an excess number of moving parts. Moreover, the number of interconnected moving parts requires the device to be lubricated. This lubrication can result in the contamination of the associated drinking water. The valve of Barreda is also problematic in that the predetermined force is not adjustable. As such, the threshold water pressure required to open the valve cannot be adjusted. This is a drawback as a user may wish to increase or decrease this threshold pressure depending upon the application.

Yet another flow regulating valve is disclosed in U.S. Pat. No. 8,707,981 to Edgeworth. Edgeworth is likewise concerned with increasing the efficiency of an associated water meter by driving out entrained air. The valve of Edgeworth includes a plunger that is biased into a sealing orientation by way of a spring. A backing plate is used to secure the spring in place. The backing plate includes two opposing shoulders with different heights. The initial tension of the spring can be adjusted by removing the backing plate and selecting which of the two shoulders are in contact with the spring. This, in turn, determines the threshold water pressure that is necessary to unseat the plunger and allow the flow of the fluid. As such, Edgeworth is an advance over Barreda as it allows the threshold pressure to be adjusted.

The device of Edgeworth, however, also suffers from drawbacks. For example, the spring tension can only be changed by disassembling the valve and removing the backing plate. Doing so requires the flow of water to be interrupted, which can be problematic in the event the fluid is water being supplied to a residence or business. Furthermore, the Edgeworth valve has only two pre-set threshold pressures. Depending upon the particular application, a user may wish to select a threshold pressure that is different that the two pre-sets offered by Edgeworth.

Still yet another flow controlling valve is disclosed in U.S. Pat. No. 10,544,569 to Chalfin. Chalfin discloses a flow regulating valve that is externally adjustable. The Chalfin device includes inner and outer housings that contain a spring biased valve disc. The spring biased valve disc can be used to open to close the valve as needed. The tension of the spring can be adjusted from outside of the outer housing via an adjustment tool. Chalfin is an advance over Edgeworth because it allows the threshold pressure to be adjusted without the need to disassemble the valve. It also allows the user to select from more than just two pre-set threshold pressures.

The Chalfin, therefore, overcomes many of the drawbacks associated with the Edgeworth and Barreda. Nonetheless, Chalfin still suffers from some drawbacks. The threshold pressure can only be adjusted via the external tool. If the external tool becomes lost or damaged, the threshold pressure cannot be adjusted. Also, depending upon the desired threshold pressure, the user may have to use the tool to repeatedly rotate the inner housing with respect to the outer. This repetitive motion may be time consuming and strenuous. It also does not allow for fine adjustments to the threshold pressure. Furthermore, the Chalfin device uses a spring as the main resistance, which limits both its effectiveness and variability. It also affects the overall size of the device.

The flow regulating valve of the present disclosure is designed to overcome these and other shortcomings present in the art.

SUMMARY OF THE INVENTION

This disclosure provides a flow control valve that is hydrostatically adjustable and that allows the threshold pressures to be adjusted via a variable orifice.

The disclosed system has several important advantages. For example, the hydrostatic control requires fewer moving parts and tools are not required to make the adjustments.

A further possible advantage is that the hydrostatic adjustment allows for an infinite number of adjustments to be made to the threshold pressure.

Still yet another possible advantage is that adjustments to the threshold pressure can be made without disassembling the valve.

Other advantages are realized by utilizing hydrostatic resistance, which allows for greater ranges of minimum and maximum threshold pressures and which further provides a device with a compact size.

Another advantage of the present system is to provide a valve that allows the threshold pressure to be automatically adjusted in response to changing water pressures.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar components throughout the several views of the drawings.

Parts List

20 Valve Assembly
22 Outer Housing of Valve
24 Valve Inlet
26 Valve Outlet
28 Bottom Portion of Outer Housing
32 Interior Area of Outer Housing
34 Flanges on Outer Housing
36 First Outlet Port
42 Fixed Sleeve
44 Outer Wall of Fixed Sleeve
46 Bottom Portion of Fixed Sleeve
48 First Opened End of Fixed Sleeve
52 Second Closed End of Fixed Sleeve
54 Flow Ports
56 Second Outlet Port
58 Interior Area of Fixed Sleeve
62 Spool
64 O-Ring
66 First End of Spool
68 Second End of Spool
72 Interior Area of Spool
74 Primary Orifice
82 Coil Spring
84 First End of Coil Spring
86 Second End of Coil Spring
92 Control Device
94 Dial of Flow Control Device
102 System
104 Fluid Supply
106 Fluid Meter
108 Valve
112 Primary Outlet
114 Secondary Outlet
116 Fluid Usage

DETAILED DESCRIPTION OF THE DRAWINGS

The present disclosure relates to a hydrostatically adjustable flow control valve. The valve can be used to, for example, compress any entrained air within a water supply. However, it has beneficial uses in connection with a variety of other fluids. In one embodiment, the valve includes a fixed sleeve that slidably receives a spool. A spring biases the spool relative to the fixed sleeve. A primary orifice is used to deliver fluid to the interior area of the fixed sleeve and spool. A control device is used to selectively vary the rate at which fluid drains from the interior area. Draining the fluid results in the spool being received within the interior of the fixed sleeve. The movement of the spool opens flow ports within the sleeve. This, in turn, allows fluid to exit the valve. Conversely, the control device can be set to prevent fluid drainage. This results in the spool extending from interior of the fixed sleeve, the closure of the flow ports, and the sealing of the valve.

Figure 1:
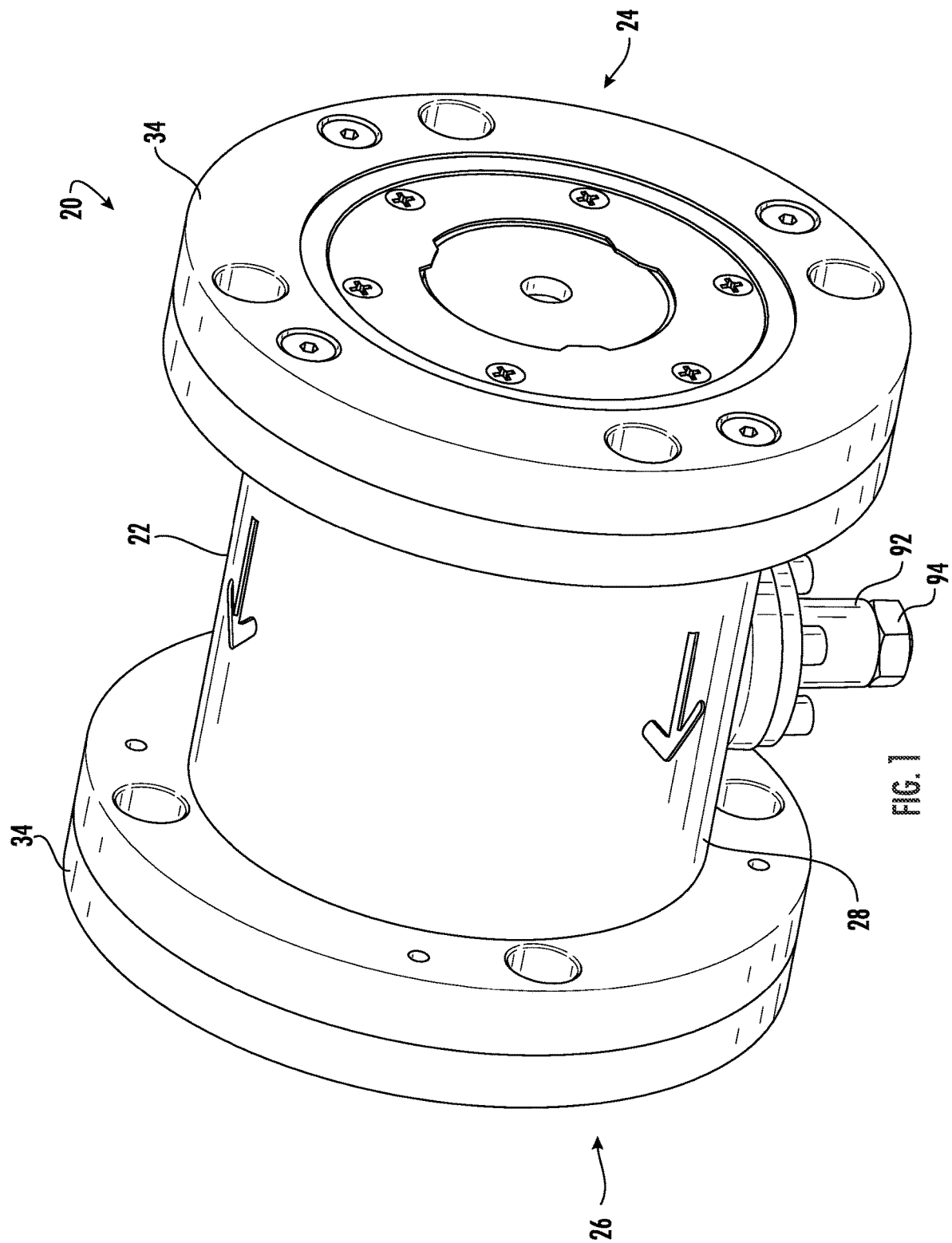
FIG. 1 is a perspective view of the flow valve of the present disclosure.
Figure 2:
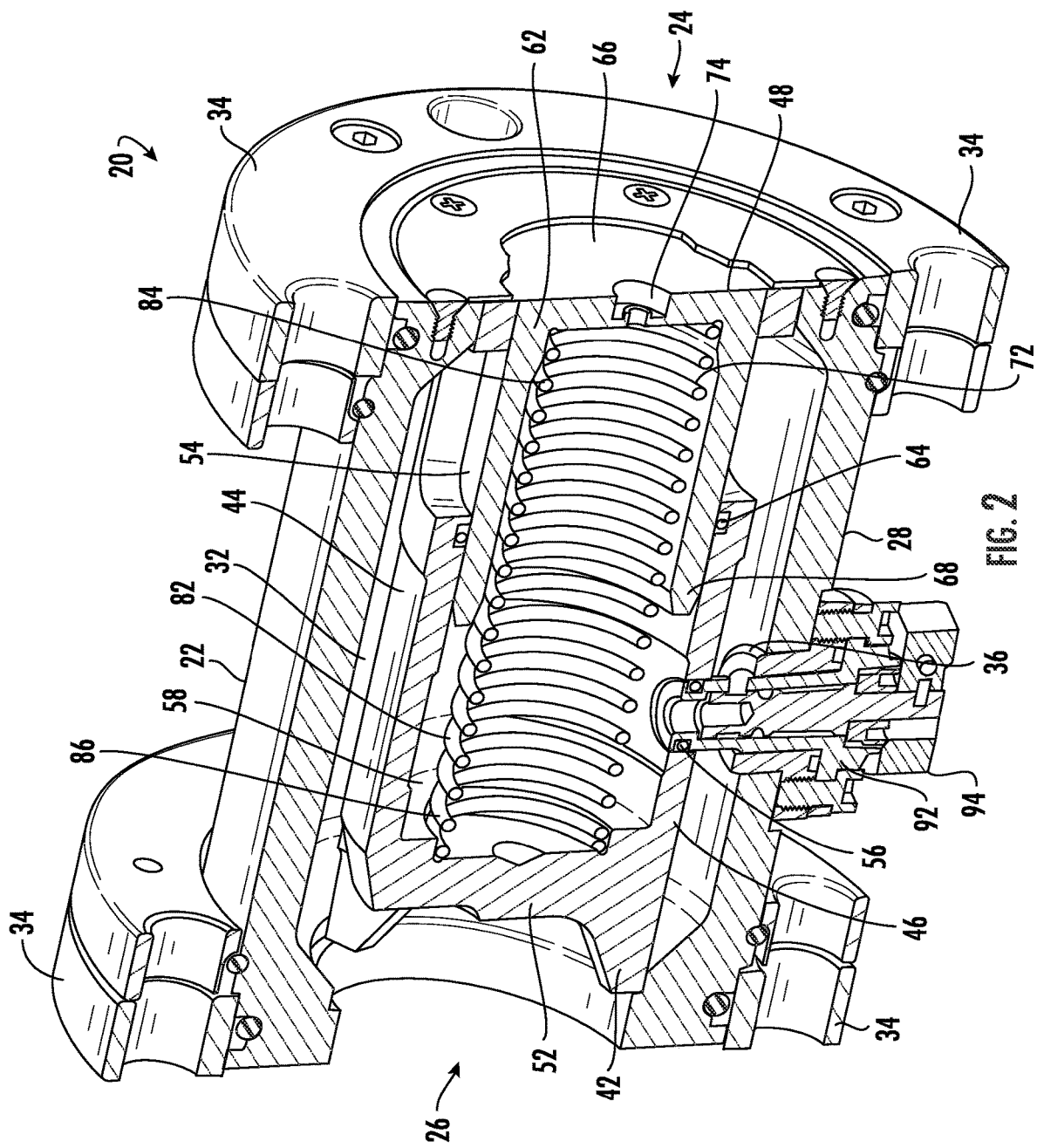
FIG. 2 is a perspective, sectional view of the flow valve in the closed state.
Figure 3:
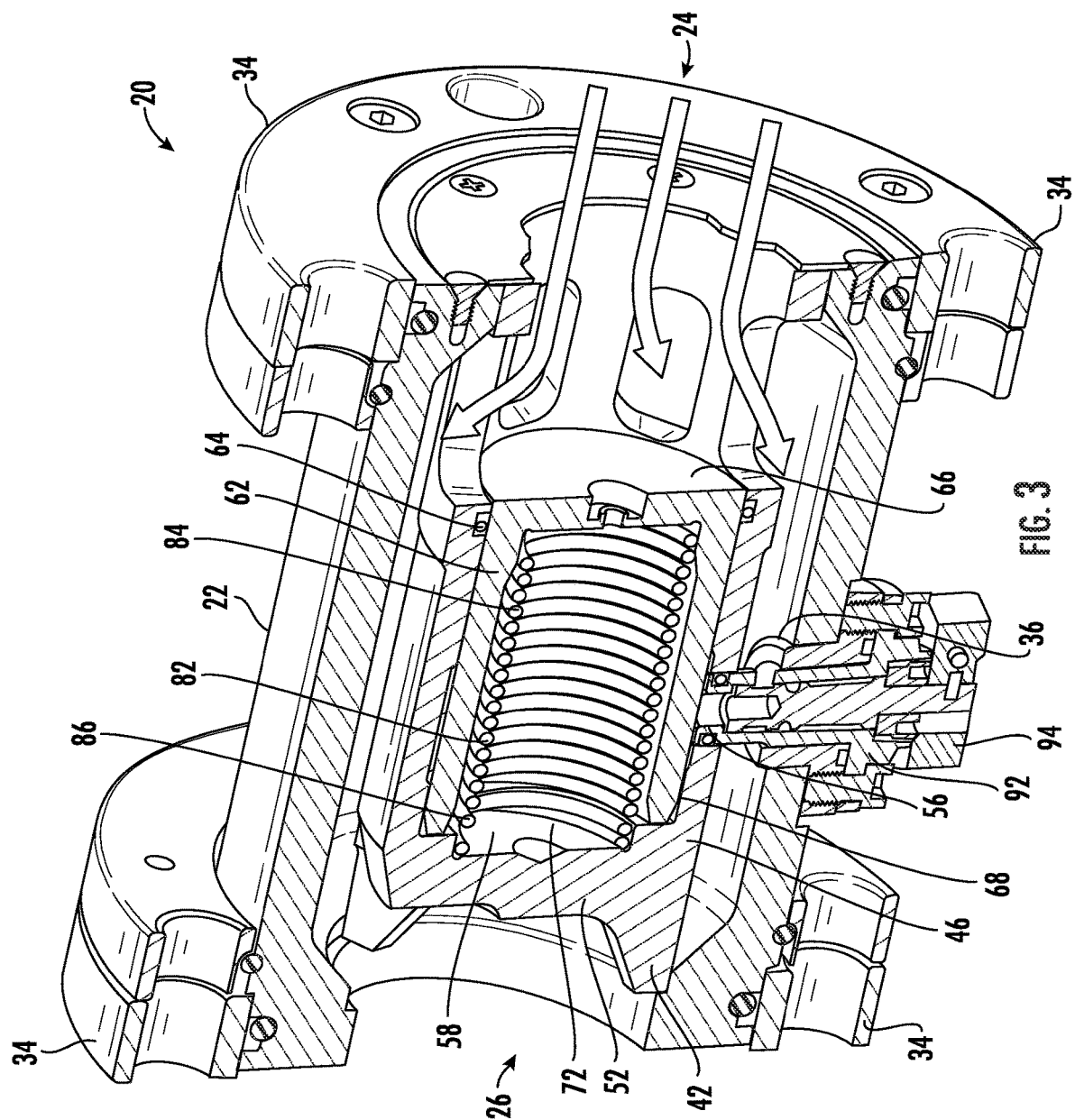
FIG. 3 is a perspective, sectional view of the flow valve in the opened state.

The hydrostatically adjustable flow valve (20) of the present disclosure is illustrated in FIGS. 1-3. As illustrated, valve (20) includes a cylindrical outer housing (22) that is defined by an inlet (24), an outlet (26), a bottom portion (28), and an interior area (32). One or more flanges (34) are positioned about both the inlet and outlet (24 and 26). These flanges (34) can be sealed by O-rings. As is known, flanges (34) allow valve (20) to be mechanically coupled to inlet and outlet flow lines. With reference to FIGS. 2-3, a first outlet port (36) is formed through the bottom portion (28) of the outer housing (22). The purpose of this outlet port (36) is described in greater detail hereinafter.

A cylindrical fixed sleeve (42) is positioned within the interior area (32) of the outer housing (22). The space between the fixed sleeve (42) and the outer housing (22) allows for the passage of the fluid to the valve outlet (26). This fixed sleeve (42) includes an outer wall (44) and a bottom portion (46). A first opened end (48) of sleeve (42) is positioned adjacent the valve inlet (24) while a second closed end (52) is positioned adjacent the valve outlet (26). As noted in FIGS. 2-3, a series of flow ports (54) are formed through the outer wall (44) at a location proximate the first end (48). As noted in FIG. 3, flow port (54) take the form of rectangular cut outs formed within outer wall (44). The number and size of the ports (54) can be selected depending upon the intended flow rate. The flow ports (54) are fluidly interconnected to the outlet (26). Namely, when ports (54) are opened, fluid flows continuously into inlet (24), out through ports (54), between the outer housing (22) and sleeve (42), and finally exiting through valve outlet (26). A second outlet port (56) is formed through the bottom portion (46) of the fixed sleeve (42) and is in fluid communication with an interior area (58) of fixed sleeve (42).

The opening and closing of ports (54) is controlled by a spool (62) that is slidably received within the first opened end (48) of the fixed sleeve (42). As illustrated, an O-ring (64) is preferably positioned between the fixed sleeve (42) and the spool (62) to maintain a fluid tight seal. Spool (62) has a first generally closed end (66), an opened second end (68), and an interior area (72). A primary orifice (74) is formed within the first generally closed end (66) and allows fluid to be delivered to the interior of fixed sleeve and spool (58 and 72).

Spool (62) thus has a first orientation wherein the first end (66) of the spool (62) is generally flush with both the first end (48) of the cylindrical fixed sleeve (42) and inlet (24). In this orientation, spool (62) blocks flow ports (54) to preclude the flow of fluid. Furthermore, the generally closed end (66) prevent the ingress of fluid. Nonetheless, in this orientation, fluid is still permitted to flow through primary orifice (74). This fluid can be permitted to accumulate within the interior of the valve or can be selectively drained as described below. Spool (62) also has a second orientation wherein the first end (66) of the spool (62) is positioned at a location inward of the first end (48). The exact position of the spool (62) relative to fixed sleeve (42) will depend upon the volume (and pressure) of fluid contained within the interior areas (58 and 72) of fixed sleeve (42) and spool (62). In the second orientation, the position of spool (62) allows fluid to flow through flow ports (54).

A coil spring (82) is positioned within the interior of valve (20). More specifically, a first end (84) of the spring (82) is positioned within the interior area (72) of the spool (62) and a second end (86) of spring (82) is positioned within the interior area (58) of the cylindrical fixed sleeve (42). The spring (82) is used to bias the spool (62) to the first orientation. However, when the fluid pressure within the interior areas (58 and 72) drops below a defined threshold pressure, spring (82) is allowed to retract, thereby allowing spool (62) to move inwardly with respect to fixed sleeve (42), thereby opening the flow ports (54).

The rate at which fluid drains from the interior of valve (20) can be adjusted via control device (92). The rate of fluid drainage also controls the threshold pressure for opening valve (20). A control device (92) is fluidly interconnected to the first and second outlet ports (36 and 56). The control device (92) preferably includes a dial (94) for selectively varying the rate at which fluid drains from the interior areas (58 and 72) of the cylindrical fixed sleeve and spool (42 and 62). The draining of this fluid results in the spool (62) attaining the second orientation and allowing the fluid to flow through the flow ports (54) and the outlet (26). In the preferred embodiment, control device (92) is a helix shaped closure member that can selectively limit flow from the outlet ports (36 and 56). However, control device (92) can employ any of a variety of closure means, such as, a needle valve. Control device (92) can optionally be electronically controlled.

Figure 4:
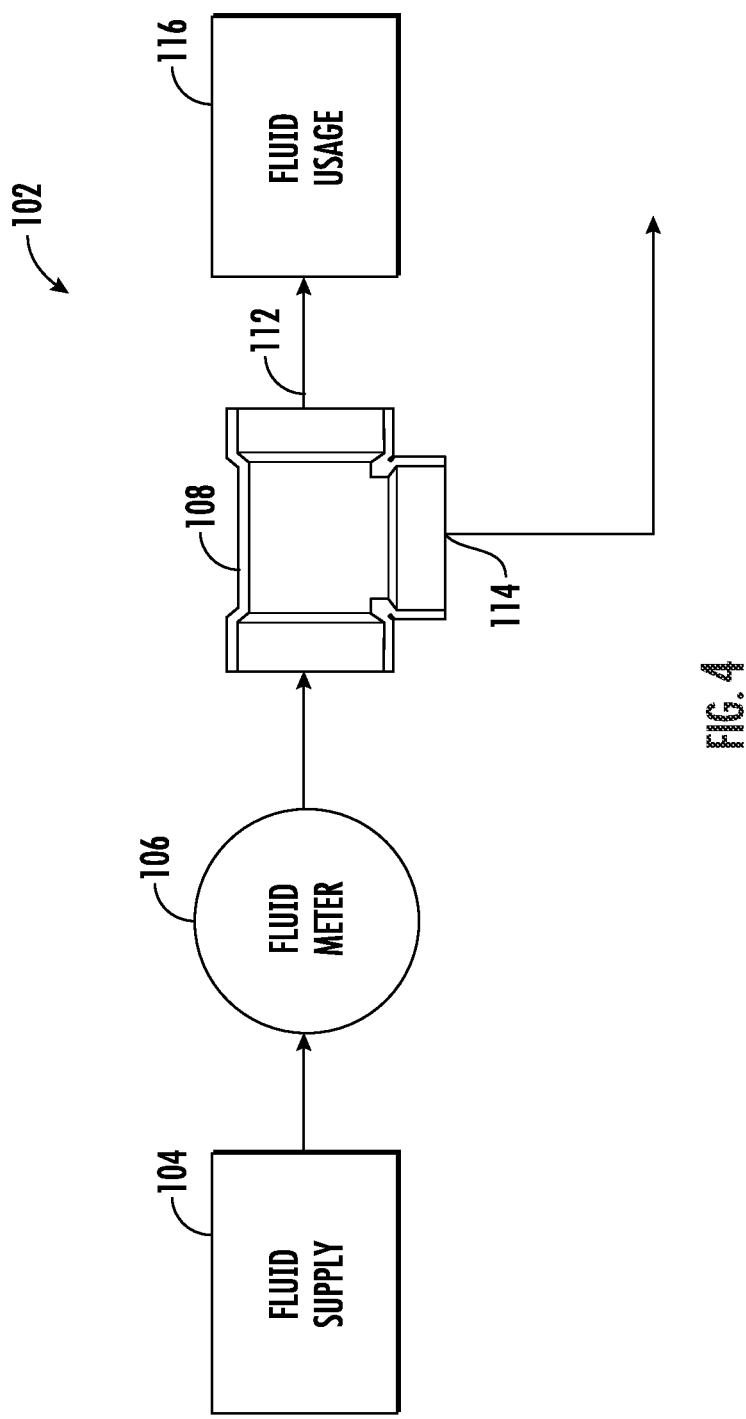
FIG. 4 is a diagram of the system of the present disclosure.

The system (102) of the present disclosure is illustrated in FIG. 4. As illustrated, valve (108) (which may be the hydrostatically controlled valve described above) is located downstream of a fluid supply (104) and a fluid meter (106). Valve (108) is used to compress entrained air within the upstream fluid supply, which in turn maintains the upstream pressure (or PSI) to increase the efficiency of meter (106). This ensures that any entrained air is not allowed to expand and also that any entrained air has the lowest possible volume when measured. The threshold pressure of valve (108) is determined by the flow rate of an associated secondary outlet (114). This drainage may be delivered to a reservoir or may be used in connection with the intended fluid usage (116).

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A hydrostatically adjustable flow valve (20) comprising:
    a cylindrical outer housing (22) including an inlet (24), and outlet (26), a bottom portion (28), and an interior area (32), flanges positioned (34) about the inlet (24) and the outlet (26), a first outlet port (36) formed through the bottom portion (28);
    a cylindrical fixed sleeve (42) including an outer wall (44), and a bottom portion (46), the cylindrical fixed sleeve (42) positioned within the interior area (32) of the cylindrical outer housing (22), the cylindrical fixed sleeve (42) including a first opened end (48) positioned adjacent the inlet (24) and a second closed end (52) positioned adjacent the outlet (26), at least one flow port (54) formed through the outer wall (44) at a location proximate the first end (48), the flow port (54) being fluidly interconnected to the outlet (26), a second outlet port (56) formed through the bottom portion (46), the cylindrical fixed sleeve (42) defining an interior area (58);
    a spool (62) slidably positioned within the first opened end (48) of the cylindrical fixed sleeve (42), the spool (62) having first closed end (66), an opened second end (68), and an interior area (72), a primary orifice (74) formed within the first closed end (66), the spool (62) having a first orientation with the first end (66) of the spool (62) is flush with the first end (48) of the cylindrical fixed sleeve (42) to thereby close the flow port (54), and a second orientation wherein the first end (66) of the spool (62) is positioned at a location inward of the first end (48) of the of the cylindrical fixed sleeve (42) to thereby partially open the flow port (54);
    a coil spring (82) having first and second ends (84 and 86), with the first end (84) of the spring (82) positioned within the interior area (72) of the spool (62) and the second end (86) positioned within the interior area (58) of the cylindrical fixed sleeve (42), the spring (82) biasing the spool (62) to the first orientation;
    a control device (92) fluidly interconnected to the first and second outlet ports (36 and 56), the control device (92) including a dial means (94) for selectively varying the rate at which fluid drains from the interior areas (58 and 72) of the cylindrical fixed sleeve and spool (42 and 62), whereby draining the fluid results in the spool (62) attaining the second orientation and allowing the fluid to flow through the flow port (54) and the outlet (26).

2. An adjustable flow valve comprising:
    an outer housing including an inlet, an outlet, a drainage port, and an interior area;
    a spool slidably positioned within the interior area of the outer housing, the spool having first and second ends, an orifice formed within the first end, the orifice allowing fluid to flow through the spool and into the interior area of the outer housing, the spool having a first orientation with the first end is flush with the inlet to thereby prevent the flow of fluid through the outlet, and a second orientation wherein the first end of the spool is positioned at a location inward of the inlet to thereby allow the flow of fluid through the outlet;
    a fixed sleeve positioned within the outer housing and wherein the fixed sleeve includes outlet ports that are closed when the spool is in the first orientation;
    a control device fluidly interconnected to the drainage port and the orifice, the control device selectively varying the rate at which fluid drains from the drainage port, whereby draining the fluid results in the spool attaining the second orientation.

3. The adjustable flow valve as described in claim 2 wherein the fixed sleeve includes outlet ports that are opened when the spool is in the second orientation.

4. The adjustable flow valve as described in claim 2 further comprising a spring positioned between the fixed sleeve and spool and wherein the spring urges the spool into the first orientation.

5. The adjustable flow valve as described in claim 3 further comprising a spring positioned between the fixed sleeve and spool and wherein the spring urges the spool into the first orientation.

* * * * *